United States Patent
Srinivasan et al.

(10) Patent No.: US 10,783,051 B2
(45) Date of Patent: Sep. 22, 2020

(54) PERFORMANCE REGRESSION FRAMEWORK

(71) Applicant: ServiceNow, Inc., Santa Clara, CA (US)

(72) Inventors: Ravishankar Srinivasan, Milpitas, CA (US); Sravan Srungarapu, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/123,776

(22) Filed: Sep. 6, 2018

(65) Prior Publication Data

US 2020/0081814 A1    Mar. 12, 2020

(51) Int. Cl.
  *G06F 11/34*  (2006.01)
  *G06F 11/36*  (2006.01)
  *G06F 8/71*   (2018.01)
  *G06F 8/65*   (2018.01)

(52) U.S. Cl.
  CPC ............ *G06F 11/3419* (2013.01); *G06F 8/65* (2013.01); *G06F 8/71* (2013.01); *G06F 11/3476* (2013.01); *G06F 11/362* (2013.01); *G06F 11/3688* (2013.01); *G06F 11/3452* (2013.01); *G06F 2201/865* (2013.01)

(58) Field of Classification Search
  None
  See application file for complete search history.

(56) References Cited

U.S. PATENT DOCUMENTS

| | | |
|---|---|---|
| 6,321,229 B1 | 11/2001 | Goldman |
| 7,020,706 B2 | 3/2006 | Cates |
| 7,716,353 B2 | 5/2010 | Golovinsky |
| 7,769,718 B2 | 8/2010 | Murley |
| 7,925,981 B2 | 4/2011 | Pourheidari |
| 8,151,261 B2 | 4/2012 | Sirota |
| 8,402,127 B2 | 3/2013 | Solin |
| 8,612,408 B2 | 12/2013 | Trinon |
| 8,646,093 B2 | 2/2014 | Myers |
| 8,832,652 B2 | 9/2014 | Mueller |
| 9,065,783 B2 | 4/2015 | Ding |
| 9,098,322 B2 | 8/2015 | Apte |
| 9,122,552 B2 | 9/2015 | Whitney |
| 9,317,327 B2 | 4/2016 | Apte |
| 9,363,252 B2 | 6/2016 | Mueller |
| 9,400,732 B2 | 7/2016 | Hod |
| 9,535,737 B2 | 1/2017 | Joy |
| 9,645,833 B2 | 5/2017 | Mueller |

(Continued)

*Primary Examiner* — Daxin Wu
(74) *Attorney, Agent, or Firm* — Fletcher Yoder PC

(57) ABSTRACT

A performance regression test that monitors a resource based on a metric measured for each of a plurality of builds of a test instance is run. Measurement data of the metric triggered by an operation is logged in an operation log for each of a plurality of builds. The operation is logged in response to an incoming request for processing associated with the performance regression test for monitoring the resource. Based on the operation log and for each of the plurality of builds, the measurement data of the metric triggered by the operation associated with the performance regression test for monitoring the resource is collected. The collected measurement data of the metric for each of the plurality of builds is presented.

17 Claims, 9 Drawing Sheets

(56) References Cited

U.S. PATENT DOCUMENTS

| | | | |
|---|---|---|---|
| 9,654,473 B2 | 5/2017 | Miller | |
| 9,720,795 B2 | 8/2017 | Faraj | |
| 9,766,935 B2 | 9/2017 | Kelkar | |
| 9,805,322 B2 | 10/2017 | Kelkar | |
| 9,819,729 B2 | 11/2017 | Moon | |
| 10,089,108 B1* | 10/2018 | Noble | G06F 8/65 |
| 2005/0166094 A1* | 7/2005 | Blackwell | G06F 11/3664 |
| | | | 714/38.14 |
| 2011/0145795 A1* | 6/2011 | Khanapurkar | G06F 11/3414 |
| | | | 717/126 |
| 2013/0152047 A1* | 6/2013 | Moorthi | G06F 11/368 |
| | | | 717/124 |
| 2014/0180738 A1* | 6/2014 | Phillipps | G06Q 10/0631 |
| | | | 705/7.12 |
| 2015/0113509 A1* | 4/2015 | Faraj | G06F 11/079 |
| | | | 717/124 |
| 2015/0254161 A1* | 9/2015 | Baril | G06F 11/3616 |
| | | | 717/124 |
| 2015/0254165 A1* | 9/2015 | Baril | G06F 11/3676 |
| | | | 714/38.1 |
| 2015/0339207 A1* | 11/2015 | Hod | G06F 11/3409 |
| | | | 717/124 |
| 2016/0314056 A1* | 10/2016 | Greene | G06F 11/3664 |
| 2017/0075791 A1* | 3/2017 | Ramakrishna | G06F 11/3664 |
| 2017/0372247 A1* | 12/2017 | Tauber | G06F 8/71 |
| 2018/0253373 A1* | 9/2018 | Mathur | G06F 11/3692 |
| 2019/0213115 A1* | 7/2019 | Takawale | G06F 8/30 |

* cited by examiner

| CREATED | TYPE | BY | RESPONSE TIME | OUTPUT LENGTH | SQL CNT | SQL TIME | ENTERPRISE RULE CNT | ACL TIME | URL | GZIPPED |
|---|---|---|---|---|---|---|---|---|---|---|
| 2018-08-01 11:33:27 | REST | ADMIN | 14 | 20 | 3 | 0 | 0 | 0 | /API/NOW/UI/PAGE_TIMIN | TRUE |
| 2018-08-01 11:33:27 | REST | ADMIN | 16 | 119 | 6 | 4 | 0 | 0 | /API/NOW/EMBEDDEDHEL | TRUE |
| 2018-08-01 11:33:26 | REST | ADMIN | 100 | 46 | 21 | 15 | 0 | 1 | /API/NOW/GUIDED_TOUR | TRUE |
| 2018-08-01 11:33:21 | FORM | ADMIN | 14 | 1,688 | 2 | 2 | 0 | 0 | /API/NOW/UI/DATE_TIME/ | TRUE |
| 2018-08-01 11:33:21 | REST | ADMIN | 477 | 14,560 | 238 | 122 | 0 | 27 | /HOME.DO | TRUE |
| 2018-08-01 11:33:19 | REST | ADMIN | 38 | 119 | 9 | 15 | 0 | 0 | /API/NOW/EMBEDDEDHELP | TRUE |
| 2018-08-01 11:33:18 | FORM | ADMIN | 183 | 60 | 26 | 38 | 13 | 1 | /API/NOW/CONNECT/CONV | TRUE |
| 2018-08-01 11:33:18 | REST | ADMIN | 215 | 921 | 13 | 8 | 0 | 0 | /HOME_SPLASH.DO?SYSPAI | TRUE |
| 2018-08-01 11:33:17 | REST | ADMIN | 2,342 | 84,267 | 2,148 | 1,031 | 0 | 0 | /API/NOW/UI/NAVIGATOR/ | TRUE |
| 2018-08-01 11:33:15 | REST | ADMIN | 43 | 302 | 7 | 8 | 0 | 0 | /API/NOW/LIVE/PROFILES/ | TRUE |
| 2018-08-01 11:33:15 | FORM | ADMIN | 42 | 188 | 4 | 2 | 0 | 0 | /API/NOW/UI/IMPERSONAT | TRUE |
| 2018-08-01 11:33:14 | FORM | ADMIN | 553 | 42,761 | 300 | 120 | 0 | 1 | /NAVPAGE.DO | TRUE |
| 2018-08-01 11:33:13 | REST | ADMIN | 138 | 20 | 12 | 26 | 0 | 0 | /API/NOW/UI/PAGE_TIMIN | TRUE |
| 2018-08-01 11:33:13 | REST | ADMIN | 12 | 1,688 | 2 | 1 | 0 | 0 | /API/NOW/UI/DATE_TIME/ | TRUE |
| 2018-08-01 11:33:13 | FORM | ADMIN | 23 | 10 | 9 | 4 | 0 | 0 | /NAV_TO.DO?URL=HOME_ | TRUE |
| 2018-08-01 11:33:13 | FORM | ADMIN | 81 | 6,952 | 12 | 6 | 0 | 1 | /LOGIN_REDIRECT.DO?SYSF | TRUE |
| 2018-08-01 11:33:12 | FORM | ADMIN | 41 | 34 | 17 | 13 | 0 | 0 | /LOGIN.DO?SCREENSIZE=1 | TRUE |

Operation Log Entry
/home.do

| | Update | Delete |

Type: Form
Table: 
View: Default View
Created By: admin
IP Adress: 38.100.144.103
Session: 10197F130F 231300F 6306ACE 1050EF7
Processing Start Time: 2018-08-01 11:33:20
User Agent: Mozilla/5.0 (Windows NT6.3; Win64;x64) AppleWebKit/537.36 (KHTML, like Gecko) Chrome/68.0.3440.84
URL: /home.do Response Time: 477
Network Time: 0
SQL Time: 122
SQL Count: 238
Enterprise Rule Time: 0
Enterprise Rule Count: 0

Client Response Time: 6,613
Client Network Time: 3
Total Page Load Time: 
Number of AJAX Requests:

Browser Time: 5,919
Client Script Time: 0
UI Policy Time: 0

600
610

PERFORMANCE REGRESSION FRAMEWORK

TECHNICAL FIELD

Embodiments described herein generally relate to software performance regression testing, and more particularly, to performing regression testing based on available operation-level metrics on incremental software builds before conducting full performance software testing at the end of the cycle.

BACKGROUND

A variety of enterprise and/or information technology (IT) related software applications may be utilized to support various functions of an enterprise such as Finance, Human Resource (HR), IT, Legal, Marketing, Sales, and the like. The software applications may be deployed on an instance platform on a server and accessed as needed over a network such as a Local Area Network (LAN) or the Internet. The server may be a local enterprise server as part of a self-hosted system or a remote server located in the Cloud as part of a cloud computing system.

Cloud computing relates to sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment a method includes: running a performance regression test that monitors a resource based on a metric measured for each of a plurality of builds of a test instance; logging measurement data of the metric triggered by an operation in an operation log for each of a plurality of builds, wherein the operation is logged in response to an incoming request for processing associated with the performance regression test for monitoring the resource; collecting, based on the operation log and for each of the plurality of builds, the measurement data of the metric triggered by the operation associated with the performance regression test for monitoring the resource; and presenting the collected measurement data of the metric for each of the plurality of builds.

In another embodiment, the method may be embodied in computer executable program code and stored in a non-transitory storage device. In yet another embodiment, the method may be implemented on a (cloud-based or self-hosted) computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIGS. 5-6 show illustrative screen shots of graphical user interfaces (GUIs) 500 and 600 of an operation log and an operation log entry in accordance with one or more disclosed embodiments.

DESCRIPTION OF EMBODIMENTS

Figure 1:
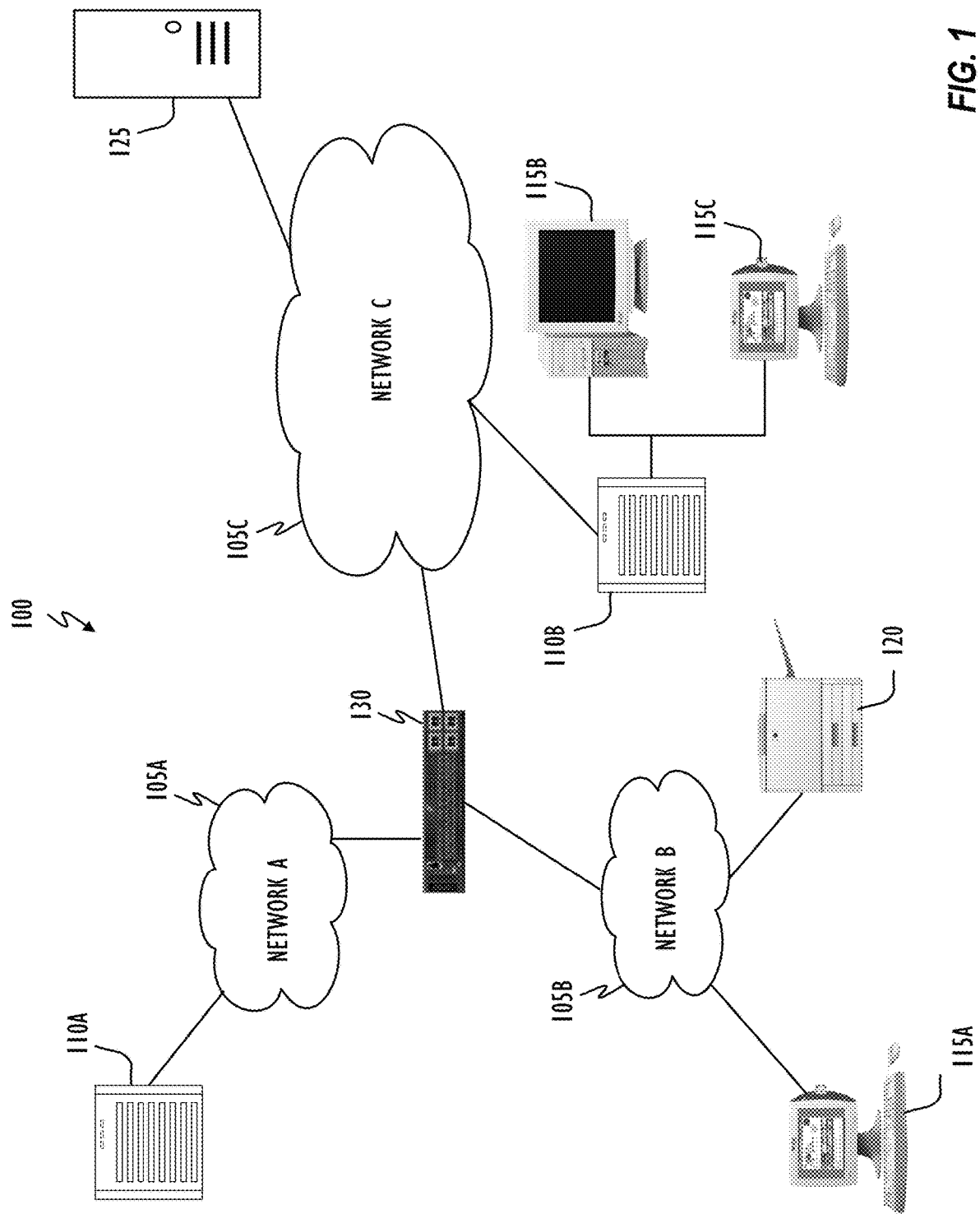
FIG. 1 illustrates a block diagram of self-hosted network system 100 where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other embodiments, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" or "memory" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system or one or more hardware processors. Example embodiments of an application include software modules, software objects, software instances and/or other types of executable code.

This disclosure pertains to implementing automated tests on a system that helps find any performance related regressions on recurring builds of an instance (e.g., production-ready platform on which one or more enterprise-level software applications are deployed) during an ongoing development process, without waiting for "full-blown" performance regression tests at the end of the software development lifecycle. Techniques disclosed herein look to utilize granular operation-level logs to monitor a resource (e.g., application programming interface (APIs), uniform resource locator (URLs), and the like) based on a minimal set of metrics already captured, so as to detect deviations between recurring builds early in the software development lifecycle.

During ongoing software development of the instance, a version control system may provide a centralized source code repository for collaborative software development so that multiple check-outs and check-ins (e.g., commits) of the source code of the instance may be made simultaneously on a same updated version of the source code. A continuous integration (CI) server may build an installable distribution of the source code as an artifact or bundled artifact (e.g., test instance) on a recurring basis (e.g., every night, every predetermined number of hours, every week, every month, every predetermined number of source code commits, based on user operation, and the like) on a dedicated machine. One or more performance regression tests (e.g., one or more test projects, or test suites) may be run on top of each recurring build of the test instance to detect any performance regressions (e.g., performance degradations, performance deviations) over time. In one embodiment, multiple bundled artifacts may be created for respective source code commits to identify the specific source code check-in or line of code that caused the performance deviation.

Each performance regression test may be configured to detect the performance regression or deviation of specific one or more monitored resources (e.g., application programming interfaces (APIs), uniform resource locators (URLs), and the like) deployed on or associated with the test instance based on one or more existing metrics already measured and captured by the test instance and stored in an operation log of a plurality of operations. A request (e.g., hypertext transfer protocol (HTTP) request) to the test instance for accessing the monitored resource (e.g., a call to the API, request to open a form corresponding to a URL, and the like) may result in creation of one or more operations (e.g., transactions, activities, and the like) in the operation log. The existing metrics already captured and measured by test instance may include processing time, central processing unit (CPU) percentage, response time, a network time, structured query language (SQL) time, SQL count, enterprise rule time, enterprise rule count, client response time, client network time, total page load time, number of requests, browser time, client script time, user interface (UI) policy time. A test module may collect, from the operation log for each build of the test instance, measurement data (e.g., values) for a particular metric (e.g., SQL time) from the plurality of metrics associated with the monitored resource (e.g., "create new incident" page of the test instance) of the performance regression test. The test module may then output, for example, a graph or trend line, indicating the value of the metric of the monitored resource over time to appropriate recipients. Based on the measurement data, the test module may also automatically detect a performance degradation event (e.g., deviation in value of measurement data for a specific build or a specific source code commit) for the monitored resource. The system may thus efficiently narrow down to a specific build or a specific source code commit that caused the deviation. Corrective action (e.g., debugging) may thus be immediately taken on source code corresponding to recurring builds to maintain or improve performance during the software development lifecycle, without waiting for the dedicated full-blown performance testing after "code complete", at the end of the software development life cycle.

FIG. 1 depicts an illustrative self-hosted network system 100 where one or more embodiments of the present disclosure may operate. This illustrative network system 100 may include a plurality of networks 105, (i.e., 105A, 105B, and 105C), each of which may take any form including, but not limited to, a local area network (LAN) or a WAN, such as the Internet. Further, networks 105 may use any desired technology (wired, wireless, or a combination thereof) and protocol (e.g., transmission control protocol, TCP). Coupled to networks 105 are data server computers 110 (i.e., 110A and 110B) that are capable of operating server applications such as databases and also capable of communicating over networks 105. One embodiment using server computers may involve the operation of one or more central systems to log user session data and identify session signatures of the user session.

Client computers 115 (i.e., 115A, 115B, and 115C), which may take the form of any smartphone, gaming system, tablet, computer, set top box, entertainment device/system, television, telephone, communications device, or intelligent machine, including embedded systems, may also be coupled to networks 105, and/or data server computers 110. In some embodiments, network system 100 may also include network printers such as printer 120 and storage systems such as 125, which may be used to store user session data or other data that are referenced herein. To facilitate communication between different network devices (e.g., data servers 110, end-user computers 115, network printer 120, and storage system 125), at least one gateway or router 130 may be optionally coupled there between. Furthermore, in order to facilitate such communication, each device employing the network may comprise a network adapter circuit and related software. For example, if an Ethernet network is desired for communication, each participating device must have an Ethernet adapter or embedded Ethernet capable ICs. Further, the devices may carry network adapters for any network in which they might participate (including, but not limited to, personal area networks (PANs), LANs, WANs, and cellular networks).

Figure 2:
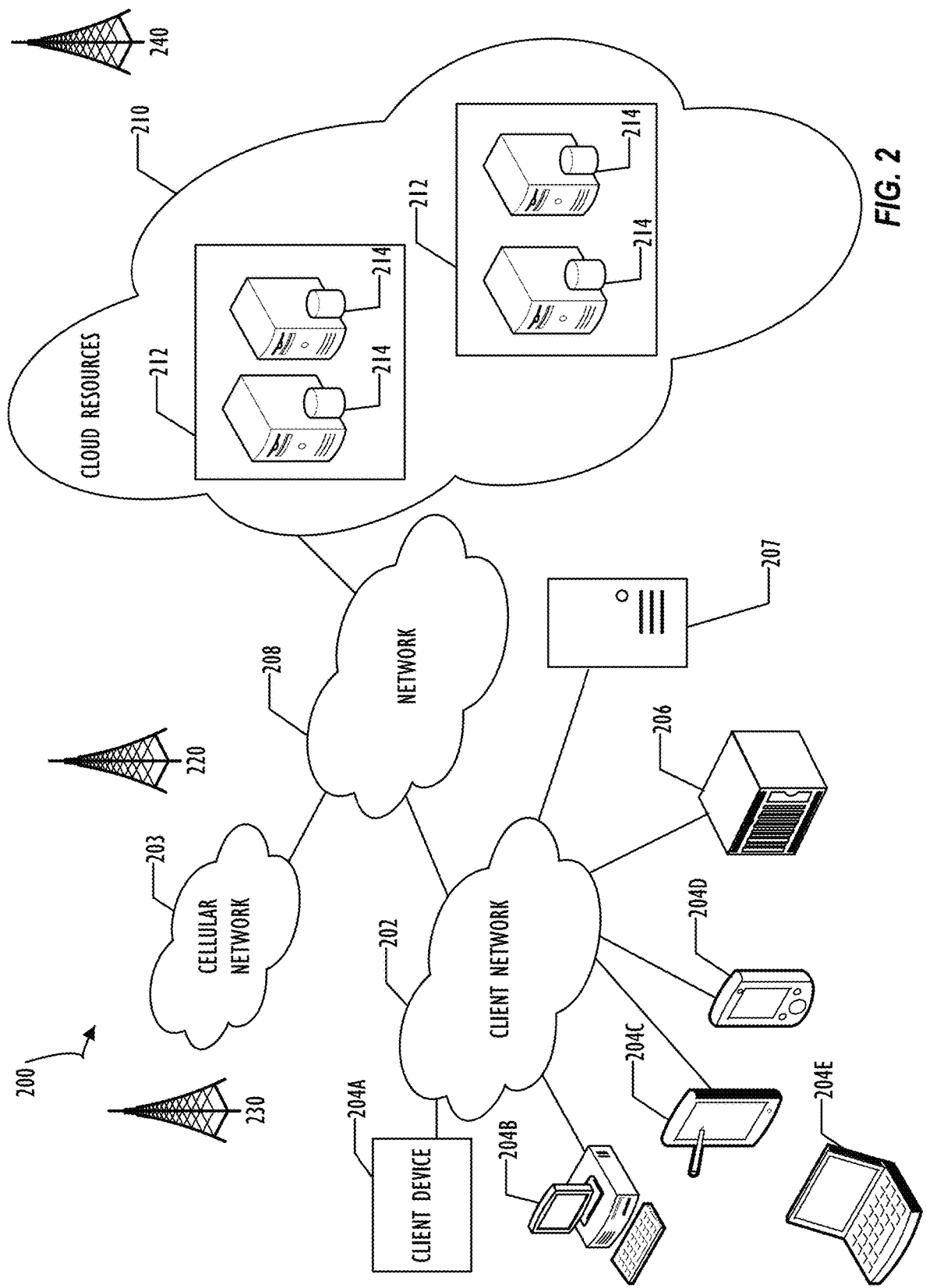
FIG. 2 illustrates a block diagram of cloud computing infrastructure 200 where one or more embodiments of the present disclosure may operate.

FIG. 2 illustrates a block diagram of an embodiment of a cloud computing infrastructure 200 where one or more embodiments of the present disclosure may operate. Cloud computing infrastructure 200 comprises a client network 202, network 208, and a cloud resources platform/network 210. In one embodiment, the client network 202 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 202 represents an enterprise network that could include or be communicatively coupled to one or more local area networks (LANs), virtual networks, data centers and/or other remote networks (e.g., 208, 210). As shown in FIG. 2, client network 202 may be connected to one or more client devices 204A-E and allow the client devices to communicate with each other and/or with cloud resources platform/network 210. Client devices 204A-E may be computing systems such as desktop computer 204B, tablet computer 204C, mobile phone 204D, laptop computer (shown as wireless) 204E, and/or other types of computing systems generically shown as client device 204A. Each of client devices 204A-E may be similar to any of client computers 115 of network system 100 shown in FIG. 1. FIG. 2 also illustrates that client network 202 may be connected to a local compute resource 206 that may include a server, access point, router, or other device configured to provide for local computational resources and/or to facilitate communication amongst networks and devices. For example, local compute resource 206 may be one or more physical local hardware devices configured to communicate with wireless network devices and/or facilitate communication of data between client network 202 and other networks such as network 208 and cloud resources platform/network 210. Local compute resource 206 may also facilitate communication between other external applications, data sources, and services, and client network 202.

FIG. 2 also illustrates that client network 202 may be connected to a computer configured to execute a management, instrumentation, and discovery (MID) server 207. For example, MID server 207 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 207 may be configured to assist functions such as, but not necessarily limited to, discovery, orchestration, service mapping, service analytics, and event management. MID server 207 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 200 also includes cellular network 203 for use with mobile communication devices. Mobile cellular networks support mobile phones and many other types of mobile devices such as laptops etc. Mobile devices in cloud computing infrastructure 200 are illustrated as mobile phone 204D, laptop 204E, and tablet 204C. A mobile device such as mobile phone 204D may interact with one or more mobile provider networks as the mobile device moves, typically interacting with a plurality of mobile network towers 220, 230, and 240 for connecting to the cellular network 203. Although referred to as a cellular network in FIG. 2, a mobile device may interact with towers of more than one provider network, as well as with multiple non-cellular devices such as wireless access points and routers (e.g., local compute resource 206). In addition, the mobile devices may interact with other mobile devices or with non-mobile devices such as desktop computer 204B and various types of client device 204A for desired services. Although not specifically illustrated in FIG. 2, client network 202 may also include a dedicated network device (e.g., gateway or router) or a combination of network devices that implement a customer firewall or intrusion protection system.

FIG. 2 illustrates that client network 202 is coupled to a network 208. Network 208 may include one or more computing networks, such as other LANs, wide area networks (WANs), the Internet, and/or other remote networks, in order to transfer data between client devices 204A-E and cloud resources platform/network 210. Each of the computing networks within network 208 may contain wired and/or wireless programmable devices that operate in the electrical and/or optical domain. For example, network 208 may include wireless networks, such as cellular networks in addition to cellular network 203. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 208 may also employ any number of network communication protocols, such as Transmission Control Protocol (TCP) and Internet Protocol (IP). Although not explicitly shown in FIG. 2, network 208 may include a variety of network devices, such as servers, routers, network switches, and/or other network hardware devices configured to transport data over networks.

In FIG. 2, cloud resources platform/network 210 is illustrated as a remote network (e.g., a cloud network) that is able to communicate with client devices 204A-E via client network 202 and network 208. The cloud resources platform/network 210 acts as a platform that provides additional computing resources to the client devices 204A-E and/or client network 202. For example, by utilizing the cloud resources platform/network 210, users of client devices 204A-E may be able to build and execute applications, such as automated processes for various enterprise, IT, field service and/or other organization-related functions. In one embodiment, the cloud resources platform/network 210 includes one or more data centers 212, where each data center 212 could correspond to a different geographic location. Within a particular data center 212 a cloud service provider may include a plurality of server instances 214. Each server instance 214 may be implemented on a physical computing system, such as a single electronic computing device (e.g., a single physical hardware server) or could be in the form of a multi-computing device (e.g., multiple physical hardware servers). Examples of server instances 214 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

To utilize computing resources within cloud resources platform/network 210, network operators may choose to configure data centers 212 using a variety of computing infrastructures. In one embodiment, one or more of data centers 212 are configured using a multi-tenant cloud architecture such that a single server instance 214, which can also be referred to as an application instance, handles requests and serves more than one customer. In some cases, data centers with multi-tenant cloud architecture commingle and store data from multiple customers, where multiple client instances are assigned to a single server instance 214. In a multi-tenant cloud architecture, the single server instance 214 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 214 causing outages for all customers allocated to the single server instance 214.

In another embodiment, one or more of the data centers 212 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 214 and/or other combinations of server instances 214, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 210, and customer-driven upgrade schedules. An example of implementing a client instance within a multi-instance cloud architecture will be discussed in more detail below when describing FIG. 3.

Figure 3:
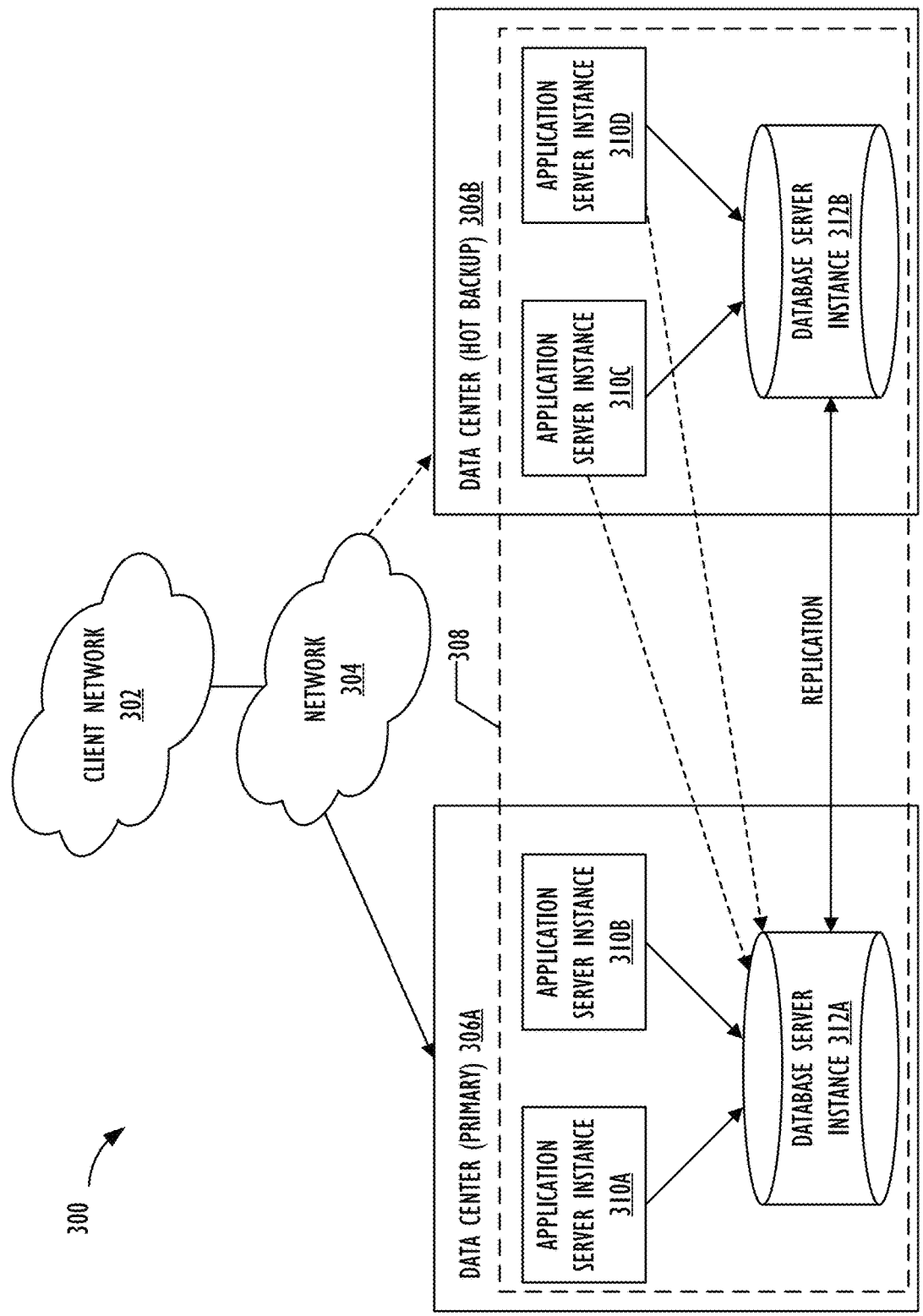
FIG. 3 illustrates a block diagram of multi-instance cloud architecture 300 where one or more embodiments of the present disclosure may operate.

In one embodiment, utilizing a multi-instance cloud architecture, a first client instance may be configured with a client side application interface such as, for example, a web browser executing on a client device (e.g., one of client devices 204A-E of FIG. 2). FIG. 3 illustrates a block diagram of an embodiment of a multi-instance cloud architecture 300 where embodiments of the present disclosure may operate. FIG. 3 illustrates that the multi-instance cloud architecture 300 includes a client network 302 that connects to two data centers 306A and 306B via network 304. Client network 302 and network 304 may be substantially similar to client network 302 and network 208 as described in FIG. 2, respectively. Data centers 306A and 306B can correspond to FIG. 2's data centers 212 located within cloud resources platform/network 210. Using FIG. 3 as an example, a client instance 308 is composed of four dedicated application server instances 310A-310D and two dedicated database server instances 312A and 312B. Stated another way, the application server instances 310A-310D and database server instances 312A and 312B are not shared with other client instances 308. Other embodiments of multi-instance cloud architecture 300 could include other types of dedicated server instances, such as a web server instance. For example, client instance 308 could include the four dedicated application server instances 310A-310D, two dedicated database server instances 312A and 312B, and four dedicated web server instances (not shown in FIG. 3).

To facilitate higher availability of client instance 308, application server instances 310A-310D and database server instances 312A and 312B are shown to be allocated to two different data centers 306A and 306B, where one of data centers 306 may act as a backup data center. In reference to FIG. 3, data center 306A acts as a primary data center that includes a primary pair of application server instances 310A and 310B and primary database server instance 312A for client instance 308, and data center 306B acts as a secondary data center to back up primary data center 306A for client instance 308. To back up primary data center 306A for client instance 308, secondary data center 306B includes a secondary pair of application server instances 310C and 310D and a secondary database server instance 312B. Primary database server instance 312A is able to replicate data to secondary database server instance 312B. As shown in FIG. 3, primary database server instance 312A replicates data to secondary database server instance 312B using a replication operation such as, for example, a Master-Master MySQL Binlog replication operation. The replication of data between data centers could be implemented in real time or by implementing full backup weekly and daily incremental backups in both data centers 306A and 306B. Having both a primary data center 306A and secondary data center 306B allows data traffic that typically travels to the primary data center 306A for client instance 308 to be diverted to secondary data center 306B during a failure and/or maintenance scenario. Using FIG. 3 as an example, if application server instances 310A and 310B and/or primary data server instance 312A fail and/or are under maintenance, data traffic for client instance 308 can be diverted to secondary application server instances 310C and 310D and secondary database server instance 312B for processing.

Although FIGS. 2 and 3 illustrate specific embodiments of cloud computing system 200 and multi-instance cloud architecture 300, respectively, the disclosure is not limited to the specific embodiments illustrated in FIGS. 2 and 3. For example, although FIG. 2 illustrates that cloud resources platform/network 210 is implemented using data centers, other embodiments of the cloud resources platform/network 210 are not limited to data centers and can utilize other types of remote network infrastructures. Moreover, other embodiments of the present disclosure may combine one or more different server instances into a single server instance. Using FIG. 3 as an example, application server instances 310 and database server instances 312 can be combined into a single server instance. The use and discussion of FIGS. 1-3 are only exemplary to facilitate ease of description and explanation.

Figure 4:
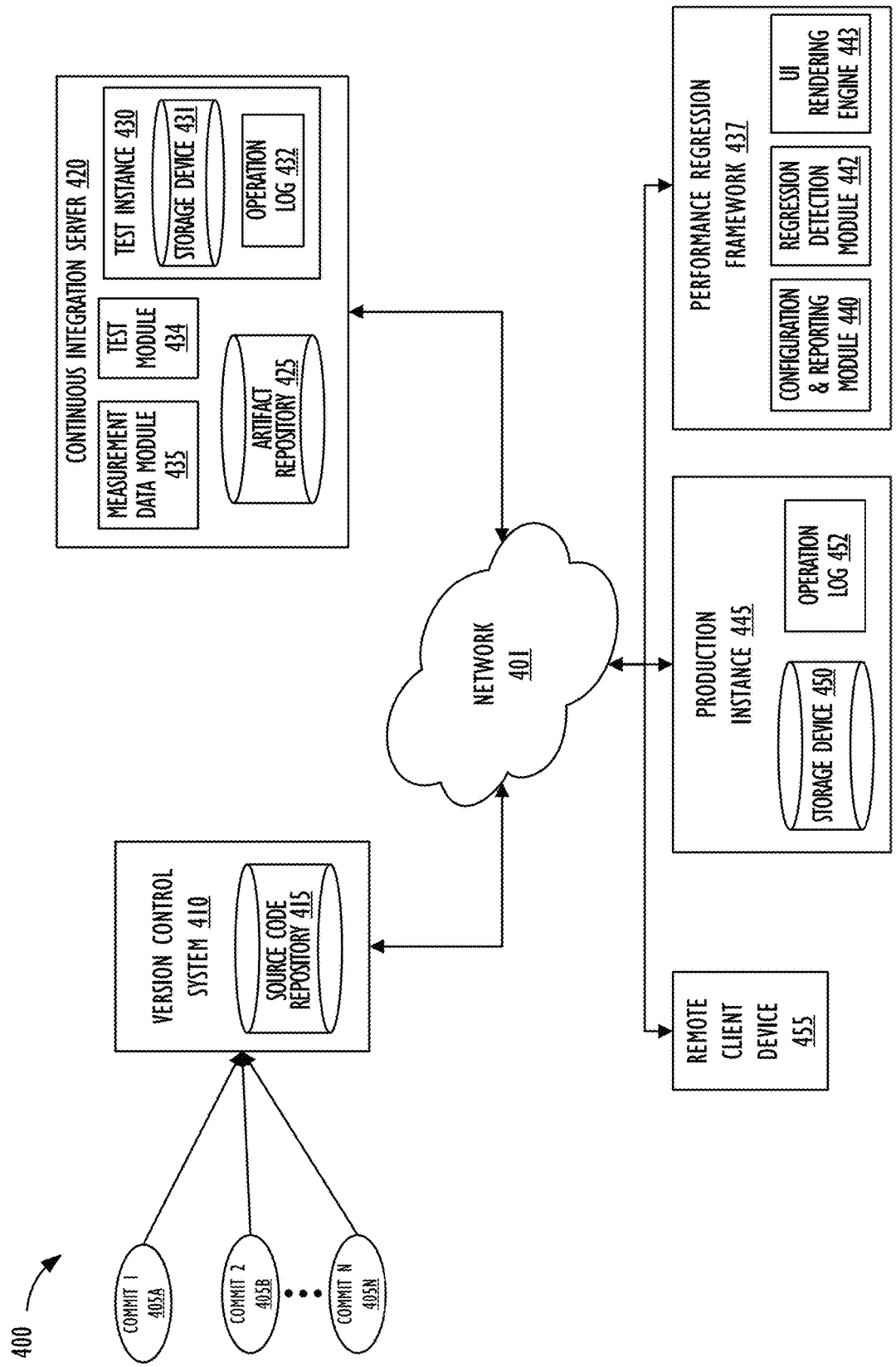
FIG. 4 illustrates a block diagram of system 400 for performance regression testing where one or more embodiments of the present disclosure may operate.

FIG. 4 illustrates a block diagram of system 400 for performance regression testing where one or more embodiments of the present disclosure may operate. As shown in FIG. 4, system 400 may include version control system 410, continuous integration (CI) server 420, performance regression framework 437, production instance 445, and remote client device 455, which are all communicatively coupled to each other via network 401. Remote client device 455 may be substantially similar to any of client computers 115, as described in FIG. 1, and client devices 204A-E, as described in FIG. 2. Network 401 may be substantially similar to any of networks 105, as described in FIG. 1, and client network 202 and network 208, as described in FIG. 2. Detailed description of remote client device 455 and network 401 is omitted here.

Production instance 445 may be substantially similar to client instance 308, as described in FIG. 3. Production instance 445 may be hosted on any of data server computers 110, as described in FIG. 1, and cloud resources platform/network 210, as described in FIG. 2, and may be accessible by a user of remote client device 455 via network 401 through an application interface such as, for example, a GUI or a web browser executing on remote client device 455, in order to access software applications, services, and data deployed on production instance 445. Thus, production instance 445 may be deployed on a server on self-hosted network system 100, as described in FIG. 1, or on a cloud-based server of cloud computing infrastructure 200, as described in FIG. 2.

Production instance 445 may include storage device 450 and operation log 452, and may act as a hosted client instance platform on which various enterprise and/or IT related software applications are deployed and through which related enterprise data from a live database is accessible. The enterprise data may be stored in storage device 450 (or elsewhere) and may correspond to data of a plurality of rows (or records) of a plurality of tables of the live database. The live database may be updated in real-time as a user interacts with (e.g., insert, update, delete a record in a table) production instance 445 (via, e.g., remote client device 455). The software applications hosted on production instance 445 may provide coverage in one or more capability areas of the enterprise such as IT, IT support, security, customer service, technical support, e-mail, backup and storage, HR, finance, legal, marketing, sales, compliance, and governance. For example, the software applications may include components related to the following applications and modules of the enterprise: IT Service Management, Incident Management, Problem Management, Change and Release Management, Benchmarks, Cost Management, Request Management, Configuration Management Database, Asset Management, Service Catalog, Knowledge Management, Survey and Assessment, Service Level Management, IT Operations Management, Discovery, Cloud Management, Event Management, Orchestration, Service Mapping, Operational Intelligence, IT Business Management, Project Portfolio Management, Demand Management, Resource Management, Agile Development, Application Portfolio Management, Cost Transparency, Financial Planning, Financial Reporting, Performance Analytics, Software Asset Management, Security, Security Operations, Governance, Risk and Compliance, Customer Service, Customer Service Management, Field Service Management, Knowledge Management, HR Service Delivery, Case and Knowledge Management, Employee Service Center, Employee Onboarding and Transitions.

Production instance 445 may also include operation log 452 that records all user interactions or activity with production instance 445. For example, any request or user interaction (e.g., HTTP request) coming into production instance 445 from an external source for processing (e.g., from a browser on remote client device 455, from an application programming interface (API), and the like) may be treated as an operation (e.g., transaction, activity, and the like) and production instance 445 may record a log of the operation as an entry in operation log 452. Thus, operation log 452 may record all browser activity for production instance 445 for troubleshooting and debugging the operations and events that take place within production instance 445. Although operation log 452 is shown as being separate from storage device 450, operation log 452 may be a database table that is actually stored in storage device 450.

FIG. 5 shows an illustrative screen shot of GUI 500 of an operation log in accordance with one or more disclosed embodiments. As shown in GUI 500, an operation log includes a plurality of rows with each row representing an operation log entry 505 (505A-N) representing an incoming request (e.g., HTTP request) to production instance 445. Each operation log entry 505 may include information relating to a plurality of categories indicated by multiple columns. Operation log entry 505 may be automatically triggered and recorded in operation log 452 when a corresponding request is received by production instance 445 and processed. The incoming request for processing may be a request for accessing a resource that is available on production instance 445 and that may be monitored for debugging and performance measurement. For example, the resource may be webpage (e.g., any active or passive webpage like a webpage form, portal, knowledge base article, and the like) hosted on production instance 445 and accessible by a URL. As another example, the resource may be an API (e.g., any API invoked for interacting with or changing the data on the live database of production instance 445) that may be consumed by making a function call to the API. The URL or API may be hosted on or be a part of production instance 445, or simply be associated with production instance 445. A plurality of URLs and APIs may be available as a plurality of resources for performing a plurality of actions associated with production instance 445. Each time a request for accessing the resource (e.g., URL, API, and the like) is received by production instance 445 and the request is processed, processing of the request may be treated as an operation (e.g., transaction), and the information corresponding to the plurality of categories gathered or measured during the processing of the operation may be recorded as operation log entry 505 in operation log 452. Thus each operation log entry 505 may correspond to a specific resource, and the resource may trigger one or more operations (and respective one or more operation log entries 505).

An exemplary operation log entry 505 is described in further detail in FIG. 6. FIG. 6 shows an illustrative screen shot of GUI 600 of an operation log entry in accordance with one or more disclosed embodiments. As shown in GUIs 500 and 600, operation log entry 505 includes information corresponding to a plurality of categories for identifying the entry and recording corresponding measurement data of a plurality of metrics 610. The plurality of categories may include information on the date and time of the browser action (e.g., browser action of remote client device 455) for the locale of the machine running production instance 445, the user who created the activity that triggered the operation log entry, the URL of the application or module of production instance 445 connected to by client browser, system generated identifier of the client (e.g., remote client device 455) making the request, IP address of the client making the request, indication of whether a compressed webpage was requested by the client, the HTTP protocol used by the browser, and the like.

In addition, as shown in GUIs 500 and 600, each operation log entry 505 may also include one or more metrics 610 that indicate performance related to processing of the operation for various criteria. Metrics 610 may be automatically captured and recorded in operation log 452 when the operation to process the corresponding incoming request (e.g., HTTP request) is performed. Metrics 610 correspond to measurable tasks or sub-operations that are triggered when the corresponding operation to process the incoming request is executed. Values of the measurable tasks or sub-operations may be gathered from various sources by production instance 445 and stored as measurement data of metrics 610 in operation log 452. Exemplary metrics that may be measured and corresponding measurement data recorded for each operation log entry 505 in operation log 452 may include: "Response Time" (e.g., Round trip response time for the browser request, in milliseconds); "Network Time" (e.g., Latency time of the network response after the browser request is made, in milliseconds); "SQL time" (e.g., Elapsed time for the execution of SQL server commands for this activity or operation); "SQL Count" (e.g., Number of SQL server commands executed for this activity); "Enterprise rule time" (e.g., Elapsed time for the execution of the enterprise rules for this activity); "Enterprise rule count" (e.g., Number of enterprise rules executed for this activity); "Output length" (e.g., Size of the output string sent by production instance 445 to the browser, in bytes). As shown in GUI 600, other metrics that may also be measured and corresponding measurement data recorded for each operation log entry in operation log 452 may include: Client Response Time, Client Network Time; Total page load time; Number of (e.g., Asynchronous JavaScript and Extensible Markup Language (AJAX®)) requests; Browser time; Client script time; UI policy time; Processing Power; Processing Time (e.g., time it takes to process the incoming request); Starting Timestamp; Ending Timestamp; and the like. The number and type of metrics, or the type of corresponding measurement data that may be gathered, measured, and recorded in operation log 452 is not limited to the above examples. Additional or alternative metrics and corresponding measurement data may also be plausible. Further, a metric may be based on one or more other metrics. As an example, the Processing Time metric may be measured based on measured metrics for the Starting Timestamp and the Ending Timestamp which are already captured and recorded in operation log 452.

In the example shown in FIG. 6, metrics 610 are measured and recorded for the resource that is indicated by the link ("/home.do") specified in the URL field. That is, when a request for accessing the "/home.do" page was received by production instance 445 for processing, the operation log entry shown in FIG. 6 was automatically created by production instance 445 and recorded in operation log 452. Metrics 610 measured and recorded in the operation log entry shown in FIG. 6 correspond to measurement data measured by production instance 445 when processing the request for accessing the "/home.do" webpage on production instance 445. In one embodiment, production instance 445 may include functionality to automatically generate the measurement data of the various metrics and store the data in operation log 452.

Returning to FIG. 4, version control system 410 provides a system for revision control when building software systems, applications, or software components that may eventually be merged and released as part of the software platform that is production instance 445. That is, when software developers continually write new source code or change existing source code associated with production instance 445 in a multi-developer environment, version control system 410 may be used for revision control of the source code currently under development.

Production instance 445 is a live production instance (of a particular enterprise customer) that acts as a hosted client instance platform where various enterprise and/or IT related software applications are deployed, and stores in storage device 450, a live database of related enterprise data (e.g., operation log 452 data of operations, including metrics and corresponding measurement data for all request activity of the particular enterprise). While production instance 445 is a live production instance of a particular customer built from a current released version of a source code, the source code in source code repository 415 of version control system 410 may correspond to a future release version of the hosted client instance platform that is currently under development. However, source code repository 415 may also include source code for the current and/or historical versions of the hosted client instance platform and associated deployed enterprise and/or IT related software applications and other relevant data. For example, one or more of the enterprise and/or IT related software applications may be updated to add, change or remove functionality, or additional applications added to the future release version of the hosted client instance platform that is currently under development. The source code (that is undergoing development) for this new, future release may be stored in source code repository 415 of version control system 410.

Version control system 410 may manage changes to the source code over time and may include a system for centralized or distributed version control for the source code. When version control system 410 is a distributed system, version control system 410 may provide revision control based on a peer-to-peer model. For example, distributed version control system 410 may maintain source code repository 415 on each peer's (e.g., software developer, quality assurance engineer, tester, project manager, administrator and the like) machine as a working copy of the source code that is kept synchronized. Distributed version control system 410 may or may not include a central repository on which client computing devices synchronize. Alternately, version control system 410 may be implemented as a centralized system with source code repository 415 as a single authoritative data store. Version control system 410 (centralized or distributed) may allow for reverting files back to a previous state, reverting an entire project back to a previous state, comparing changes over time, determining who may have introduced an issue and when, and the like.

Check-outs and check-ins (e.g., commits 405) of source code may be done on the source code in source code repository 415 as a single authoritative data store in centralized version control system 410. Alternatively, in distributed version control system 410, no single repository is authoritative, and data can be checked out and checked into (e.g., commits 405) any repository. The changes may then be synchronized across repositories 415 by exchanging patches from peer to peer. In one embodiment, version control system 410 for software development and other version control tasks may be implemented using GIT®, Apache Subversion®, and other similar technologies.

Version control system 410 may be configured to interface with a continuous integration (CI) server 420 via network 401. The interface between version control system 410 and CI server 420 may be realized as an application programming interface (API) or a plugin. CI server 420 may enable setting up of a continuous integration or continuous delivery environment for various combinations of programming languages and source code repositories using pipelines, as well as automating other routine development tasks. The continuous integration or continuous delivery environment of CI server 420 may be implemented via available commercial or open source technologies such as Jenkins®, Appveyor®, Atlassian Bamboo®, and the like. CI server 420 may include artifact repository 425, test instance 430, measurement data module 435, and test module 434. CI server 420 may provide a robust environment for orchestrating the entire chain of building, testing, code analysis, and deployment tools for running performance regression tests on recurring builds based on a current state of the source code (that is under development) in source code repository 415 of version control system 410. A build refers to a bundled distribution that is based on a current state of the source code in source code repository 415. The bundled distribution is used to bring up an instance (e.g., test instance 430) that includes the hosted client instance platform on which various enterprise and/or IT related software applications are deployed and corresponding database schema created for storing related enterprise data (e.g., operation log data) in a database. Thus, test instance 430 brought up from the bundled distribution of the recurring build is similar to production instance 445, except that it is based on an updated (or modified) version of the source code which is under development.

Test module 434 on CI server 420 may enable operations such as create test projects, run test projects, trigger recurring builds (e.g., test instance 430) using build tool (e.g., Maven®) profiles and based on predetermined criteria, and the like. CI server 420 may thus call build tool profiles using jobs at any stage of orchestration (generally in test phase) and complete operations. Test module 434 may also be deployed as a pluggable utility on, for example, remote client device 455, for developers to create or run test projects (e.g., test projects can be plugged in test module 434 as a java archive (JAR) file created by developers).

Test module 434 may provide a library of tools (e.g., profiles, batch, command line options, or scripts) based on which developers may create the test projects for performance regression testing of any module, functionality, software application or application component (e.g., a monitored API resource, a monitored URL resource, and the like) that is deployed on or otherwise associated with a given build artifact or bundled artifact (e.g., test instance 430). For example, test module 434 may provide a developer with an out of the box (OOTB) client for load testing functional behavior and measuring performance of various application components of the given build. The OOTB (e.g., HTTP) client may enable testing by triggering operation requests (e.g., HTTP requests) to the build artifact. The OOTB client may include OOTB scripts for performing various routine test project tasks. The OOTB scripts may be written in any appropriate load testing tool like JMeter®, Selenium®, LoadRunner®, and the like. For example, the OOTB scripts may provide functionality for handling authentication while logging-in to the build artifact. The OOTB scripts may support single sign-on (SSO) authentication in addition to default authentication mechanisms. Test module 434 may also support various file types including excel, xml, html, comma separated value (csv) and the like to read test projects, test cases and/or test results.

CI server 420 may be configured via test projects in test module 434 to trigger and host builds by various means, for example, by commit (e.g., one or more commits 405) in version control system 410, by scheduling via a time based job scheduler, and by requesting a specific build URL. Test module 434 may also be configured to trigger builds based on completion of other builds in a queue. That is, test module 434 may poll version control system 410 at recurring (e.g., every predetermined (fixed or changing) number of hours, days, weeks, months, and the like) intervals, or in response to receiving a poll command from a developer console (e.g., in response to a developer committing (e.g., commit 405) source code to source code repository 415) to bundle a distribution based on a current state of the source code in source code repository 415 and create a new build as test instance 430. For example, CI server 420 may use build tools (e.g., Maven®) to compile source code obtained by polling version control system 410 and create binaries for execution. In one embodiment, test module 434 may "cut" a new build every night using the source code from source code repository 415 to which one or more commits (e.g., commit 405) may have been applied. The new nightly build artifact may be deployed as test instance 430 on CI server 420 for performance regression testing. In one embodiment, one or more of the builds (e.g., artifacts, bundled artifacts) created by test module 434 may be stored in artifact repository 425.

Test instance 430 may be deployed on CI server 420 or on a separate physical machine or server. Like production instance 445, test instance 430 may also act as a hosted client instance platform on which various enterprise and/or IT related software applications are deployed. However, test instance 430 may be based on source code that is undergoing development and may be considered to be a production-ready instance that acts as a test hosted client instance platform on which various enterprise and/or IT related software applications are deployed for testing. Database schema of test instance 430 may also be created to provide test instance data storage capability. Thus, test instance 430 may correspond to an OOTB "vanilla" instance whose components including the instance, database, and the like may all physically reside on a same machine dedicated for testing every (e.g., nightly) build during the software development lifecycle. Further, like production instance 445, test instance 430 may also include storage device 431 and operation log 432. Functionality of storage device 431 and operation log 432 is respectively similar to that of storage device 450 and operation log 452 (except that storage device 431 may not include any production data of any enterprise since test instance 430 is not a production instance that is released into production to an end customer). Further detailed description of storage device 431 and operation log 432 is omitted here.

Test module 434 may run one or more test projects (e.g., performance regression test) on recurring build artifacts deployed as test instance 430. A test project may be configured to test performance degradation of predetermined applications, components, or modules deployed for testing on test instance 430 by triggering corresponding operations for processing by test instance 430. In one embodiment, test module 434 may be configured to automatically build new artifacts or builds on a recurring basis, install the build on CI server 420, bundle the installable distribution to bring up test instance 430, and run one or more test projects on the up and running test instance 430. Each test project may track one or more predetermined metrics (e.g., CPU time, SQL time, SQL count, Enterprise rule count, and the like) for a predetermined resource (e.g., a specific URL, a specific API, and the like) associated with test instance 430 whose performance is to be monitored for degradation or deviation. In one embodiment, a developer may write script (e.g., a JAR file) that extends a library of tools provided by an OOTB client of test module 434 to create the test project for testing the one or more predetermined metrics for the predetermined resource. In another embodiment, the developer may simply utilize the library of tools provided by the OOTB client of test module 434 to create the test project for testing the one or more predetermined metrics for the predetermined resource. For example, the developer may simply feed in information regarding the predetermined resource (e.g., one or more URLs, one or more APIs, and the like) to be monitored in a file (e.g., csv file, excel file, text file, and the like) to test module 434, and set one or more parameters (e.g., frequency of builds, automatic processing of the test project, one or more metrics to be tracked, and the like) to create the test project. Test module 434 may then take the file and utilize the OOTB client and scripts to handle authentication login to test instance 430, and load the predetermined resource for a predetermined number of iterations to thereby generate corresponding operation log 432 data including measurement data of a plurality of metrics including the particular metric for the predetermined resource being tracked for regression in the test project.

That is, when the test project is run on test module 434 for each build of test instance 430, one or more requests (e.g., HTTP requests) for accessing the predetermined resource on test instance 430 may be triggered for processing by each build of test instance 430, and corresponding one or more operations may be recorded in corresponding operation log 432 of each build of test instance 430 as one or more operation log entries with corresponding measurement data of a plurality of metrics captured. Based on a comparison of the recorded measurement data of one or more predetermined metrics tracked by the test project between multiple builds of test instance 430, test module 434 may detect performance degradation or deviation for the predetermined resource in a simple manner. That is, by creating test projects that rely on preexisting operation-level metrics that are already captured and recorded as operation log entries in operation log 432, and by triggering corresponding operations of the monitored resource for each (e.g., nightly) build of test instance 430 by running the test project on the build, collecting corresponding operation-level metric measurement data, and capturing any deviations in the metric measurement data between builds, performance degradation for the monitored resource can be detected (and fixed or addressed by debugging) quickly during the software development lifecycle, without waiting for the "full-blown" performance testing at the end of the cycle.

For example, the test project may be created so that for every nightly build of test instance 430, a predetermined metric (e.g., SQL count) of a predetermined resource (e.g., URL resource of "/home.do" webpage whose operation log entry is shown in FIG. 6) of test instance 430 is monitored for performance degradation. When this test project is run on every nightly build, the "/home.do" webpage is accessed for a predetermined number (e.g., 100) of times, thereby triggering a corresponding number of operations for processing by test instance 430. For each operation of accessing "/home.do" webpage, a corresponding operation log entry (e.g., as shown in FIG. 6) may be generated and recorded in operation log 432 with corresponding measurement data of plural metrics (e.g., Response Time of "/home.do" page; total number of SQL counts triggered by "/home.do" page; and the like). Based on the generated operation data in operation log 432 for each nightly build, the SQL count is determined for the "/home.do" webpage by, for example, averaging the SQL count of each of the predetermined number of operations of accessing the "/home.do" webpage the predetermined number of times. The measured SQL count for "/home.do" webpage for each build may then be trended for comparison to identify a build where the SQL count may have increased by a predetermined threshold amount, thereby identifying the build where the "SQL count" performance of the "/home.do" webpage deviated or degraded.

By identifying the build (and corresponding one or more source code commits 405) where performance deteriorated (e.g., deviation in value), debugging operations to restore performance as measured by the test project may be dramatically simplified because the regression can be pinpointed to a specific (e.g., nightly) build instead of having to later perform root cause analysis after "code complete" at the end of the software development lifecycle. In addition to regression testing on recurring builds during ongoing software development process based on system 400 and debugging based on the identified regressions on a build-by-build basis, "full-blown" performance testing may also be performed at the end of the development process, before release of the software into production. The "full-blown" performance testing may be performed during a time dedicated for testing at the end of the cycle in a simulated load environment with a production similar hardware infrastructure where a test instance may be installed with a cluster. In "full-blown" performance testing, customer load traffic patterns may be mimicked to test instance behavior in a simulated production "real-world" environment and the behavior and performance of the test instance compared to a current release (e.g., production instance 445). However, performance "bugs" discovered during the "full-blown" performance testing may require extensive root cause analysis and may be very expensive to fix.

By performing regression testing based on system 400, many regressions may be proactively detected (and debugged right away) during ongoing development process, thereby simplifying the debugging process at the end of the cycle during the "full-blown" performance test. That is, inserting this additional layer of testing based on system 400 during development may address regression issues upfront before starting the "full-blown" performance testing. As a result of the additional layer of testing, significant time and cost savings are achieved that may otherwise be incurred during the complex and expensive "full-blown" performance testing. By utilizing measurement data of preexisting metrics that are already being captured in operation log 432 at a granular level of an operation, system 400 may be able to generate performance related output of each build of test instance 430 for regression testing in an efficient manner, without relying on expensive hardware or on expensive end of cycle "full-blown" functional performance tests. Further, by implementing system 400, a developer may immediately be able to assess performance impact of a source code commit (e.g., commit 405) based on trended operation-level metric measurement data. Thus, the need for the developer to have to wait for availability of test infrastructure of the end of cycle "full-blown" functional performance test is diminished.

Since performance regression testing on every build by system 400 is performed based on operations recorded in operation log 432 and corresponding preexisting metrics already captured by test instance 430, consistency of the measurement of the metrics captured in operation log 432 for each build must be ensured. Further, since the measurement of the simple operation-level metrics may vary from machine to machine, system 400 ensures consistency in measurement by utilizing a same set of hardware (e.g., same CPU cycle, same machine time) of a dedicated physical machine (e.g., CI server 420) to perform testing on every build. Measurement data of the metric may thus be compared between builds with high accuracy to detect performance regression.

Returning to FIG. 4, for a given test project run by test module 434, measurement data module 435 may collect from corresponding operation data in operation log 432 for each build, measurement data of one or more metrics being tracked by the test project for the particular monitored resource. The measurement data collected by measurement data module 435 for the test project for each build may be published for consumption to performance regression framework 437. Alternately, measurement data module 435 may collect and publish measurement data of all captured metrics in associated operation log entries in operation log 432. One or more metrics out of all published metrics may then be consumed further downstream, as appropriate, based on the corresponding test project specifications.

Performance regression framework 437 may be hosted on a server and coupled to CI server 420 via network 401. Alternately, performance regression framework 437 may be provided as a service or run as a process on one or more of CI server 420, production instance 445, and remote client device 455. Performance regression framework 437 provides a tool for consuming measurement data published by measurement data module 435 for each test project, and presenting the data to a user by visualizing the data. In addition, performance regression framework 437 may include logic for automatically detecting performance regression based on the consumed data, and predetermined setting and presenting results of the detection to the user. Performance regression framework 437 may include configuration and reporting module 440, regression detection module 442, and user interface (UI) rendering engine 443. Although not shown in FIG. 4, performance regression framework may also include a storage device for storing measurement data received from measurement data module 435.

Configuration and reporting module 440 may act as a front-end for a user (e.g., developer) to set configuration and reporting requirements for each test project. Configuration and reporting module 440 may allow a user to set, for each test project whose measurement data is received from measurement data module 435, one or more metrics that are to be trended over time for each build. Based on the configuration settings, for each recurring build of test instance 430, measurement data received from measurement data module 435 for the one or more metrics to be tracked for regression of a resource being monitored by the corresponding test project may be stored in a storage device. Configuration and reporting module 440 may allow a user compare measurement data of a predetermined metric for two or more builds (e.g., previous released version corresponding to production instance 445, and current nightly build) specifically identified by the user. Configuration and reporting module 440 may also allow a user to set reporting parameters so that appropriate users may be notified (e.g., via email) when updated measurement data from measurement data module 435 is collected, trended, and visualized.

UI rendering engine 443 may include logic to visualize the measurement data at the front end. For example, UI rendering engine 443 may include logic to visualize widgets on a client device (e.g., remote client device 455). Widgets may refer to graphical visualizations of scores (e.g., measurement data) of a metric associated with a monitored resource. Widgets can be enhanced by adding targets, thresholds, trendlines, and useful comments for significant changes. An exemplary graph widget visualizing a trendline of a monitored metric based on measurement data from measurement data module 435 is illustrated in FIG. 7.

Figure 7:
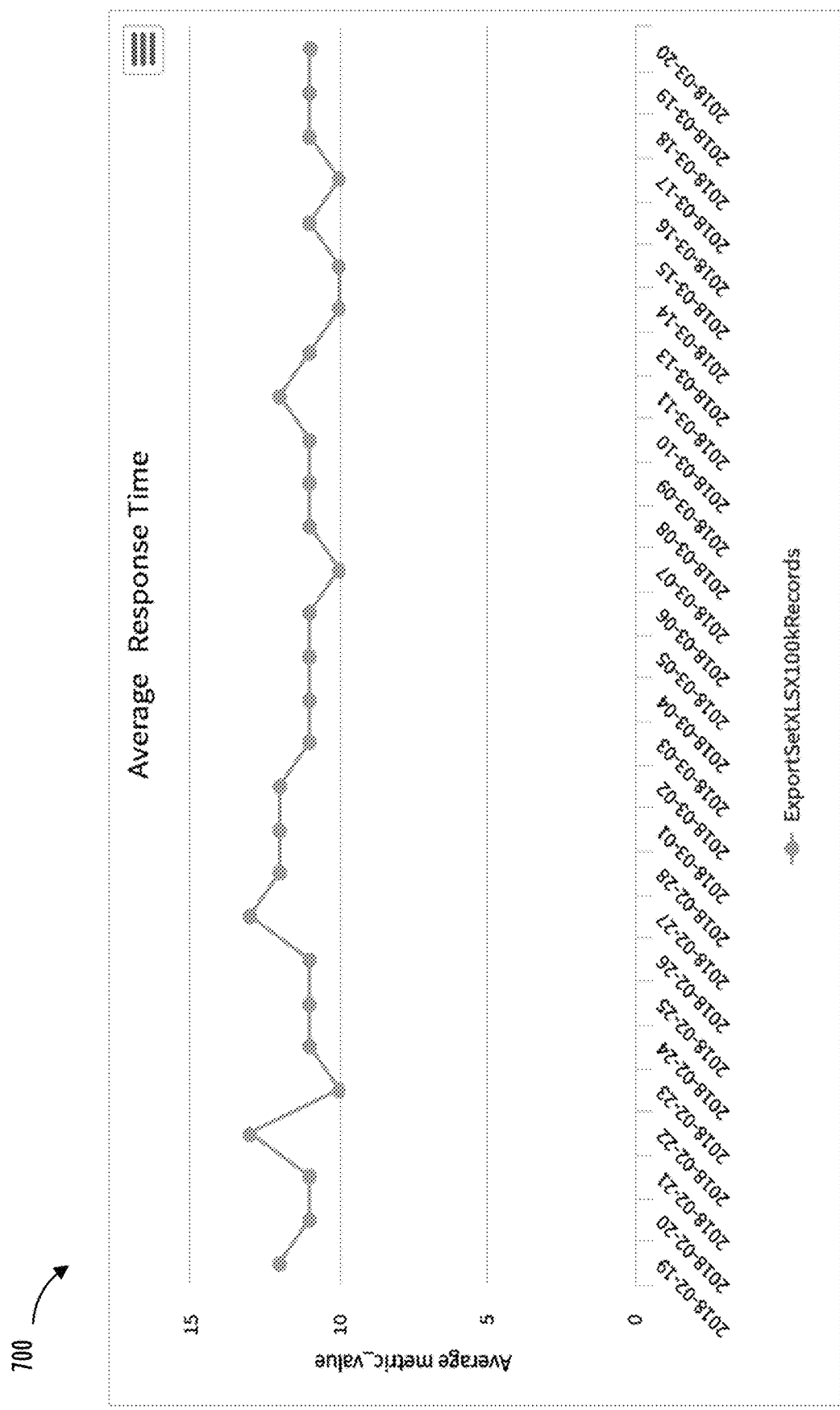
FIG. 7 illustrates widget 700 visualizing a trendline for a monitored metric in accordance with one or more disclosed embodiments.

In the example shown in FIG. 7, widget 700 shows the trend of the value of the "Average Response Time" metric for a corresponding resource based on measurement data of the response time metric received from measurement data module 435 for each of a plurality of daily builds of test instance 430 over a one-month period. By visually presenting the metric data in widget 700, performance regression of the corresponding resource can be easily identified and tracked.

Performance regression framework 437 may also include regression detection module 442 for automatically detecting regression for a given test project based on received corresponding measurement data. Based on preset parameters set by a user, empirical or heuristics data, and the like, regression detection module 442 may set a condition (e.g., threshold value for a build, threshold difference between builds, and the like) corresponding to a metric of a monitored resource. Based on the value of the metric of the monitored resource for each build, regression detection module 442 may determine whether the set condition is satisfied. Regression detection module 442 may thus automatically detect regression corresponding to a particular build for the monitored resource. Configuration and reporting module 440 may further report the automatically detected regression to appropriate users so the users may act on the regression right away and prevent the deterioration in performance, or otherwise determine (e.g., via cost benefit analysis) whether the deterioration in performance is justified for making the corresponding change in the source code that caused the deviation.

In addition to detecting the specific build that caused the performance degradation for the monitored resource, regression detection module 442 may further include logic to narrow down to a specific commit (e.g., one of commits 405A-N), or to a specific line of code in the specific commit, corresponding to the specific build that caused the regression. For example, upon detecting the particular build that caused the regression, regression detection module 442 may trigger execution of a "child" test project by test module 434. Test module 434 may then in turn run the "child" test project for the monitored resource by replaying a plurality of commits (e.g., commits 405) that are associated with the particular detected ("parent") build and installing a plurality of "child" builds (e.g., bundled artifacts) respectively corresponding to plurality of commits. Test module 434 may then run the test project on each "child" build (e.g., bundled artifact) to detect measurement data of the metric of the monitored resource from corresponding operation log 432. Based on the detected measurement data for each "child" build, regression detection module 442 may be able to narrow down to a specific "child" build (and corresponding source code commit) that caused the performance regression. Configuration and reporting module 440 may then report the automatically detected deviation of the "child" build to appropriate users so that targeted and efficient debugging operations may be performed with respect to the particular commit (e.g. one of commits 405A-N), or the particular line of code in the particular commit, that caused performance degradation of the metric.

Figure 8:
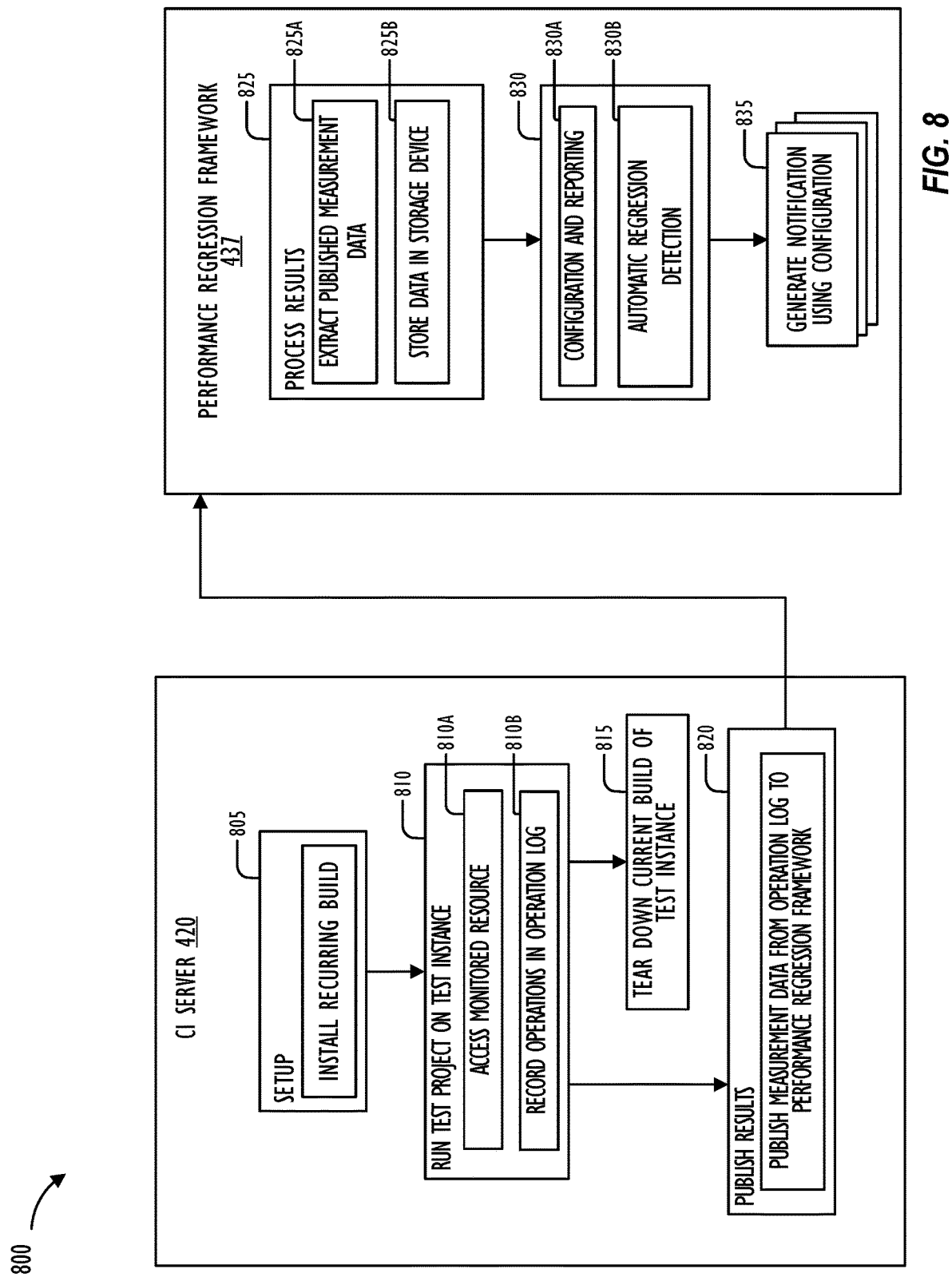
FIG. 8 shows flowchart 800 for performance regression testing in accordance with one or more disclosed embodiments.

FIG. 8 shows flowchart 800 for performance regression testing in accordance with one or more disclosed embodiments. As shown in FIG. 8, flowchart 800 begins at block 805 when CI server 420 (e.g., test module 434) performs the recurring setup of building a bundled distribution (e.g., build, artifact, or bundled artifact, a specific instance of which is test instance 430) that is based on a current state of the source code in source code repository 415. For example, CI server 420 may install a new build every night that reflects updates (e.g., one or more commits 405) made to the source code for that day.

At block 810, test module 434 may run a particular test project on test instance 430 built at block 805. The test project may be for a particular monitored resource (e.g., specific API or URL on test instance 430) and may be configured to track regression based on one or more preexisting metrics (e.g., SQL time, processing time, and the like) that are already captured for each operation (e.g., incoming HTTP request to test instance 430) on test instance 430. Thus, at block 810A, test module 424 may execute the test project by accessing the associated monitored resource, and at block 810B, test instance 430 may automatically record in operation log 432, operations associated with processing the request associated with accessing the monitored resource as operation log entries. Further, at block 810B, test instance 430 may automatically record for each operation log entry, measurement data of a plurality of metrics (e.g., see FIGS. 5-6).

At block 820, measurement data module 435 may collect measurement data of metrics associated with operation log entries in operation log 432 that correspond to or are triggered by processing the request associated with accessing the monitored resource tracked by the test project by test instance 430. The collected measurement data may then be published by measurement data module 435 to performance regression framework for consumption and trending. For example, an API of measurement data module 435 may push the collected data to performance regression framework 437. Thus, measurement data module 435 may keep publishing the collected measurement data for each build.

Further, at block 815, test module 434 may tear down the current build of test instance 430 (installed at block 805) after relevant measurement data in operation log of the current build of test instance 430 has been published. For example, test module 434 may use an API to tear down the current build of test instance 430. Alternately, test module 434 may store the current build as an installable distribution in artifact repository 425.

Processing performed at blocks 805-820 may be repeated for each build of test instance 430. Setup of each build may be triggered by test module 434 based on predetermined criteria (e.g., on a periodic or aperiodic basis, "on-demand" based on user operation, by polling version control system 410 for detecting changes to the source code, and the like).

For each build (e.g., artifact, bundled artifact) installed by CI server 420, performance regression framework 437 may process the collected measurement data at block 825 by extracting the measurement data (block 825A) published by measurement data module 435 (e.g., using an API). At block 825B, performance regression framework 437 may store the extracted measurement data for one or more test projects in a storage device. Thus, block 825B, may result in storage of measurement data for a plurality of builds.

At block 830, performance regression framework 437 may access one or more settings for a test project whose data was extracted and stored at block 825 to configure reports (block 830A), notify appropriate users, and automatically detect regression (block 830B) for the monitored resource associated with the test project. For example, the settings may specify out of the plurality of metrics whose measurement data is stored at block 825B, a particular metric that is to be trended over time for the plurality of builds. The settings may also include notification and reporting settings for outputting the measurement data for display. At block 830B, performance regression framework 437 may automatically detect regression for a particular build, commit, or line of code, based on a comparison of corresponding measurement data of a metric with corresponding measurement data of other builds, commits, or lines of code. For example, performance regression framework 437 may detect the regression when a value or a change in the value of the measurement of the metric of the monitored resource satisfies a predetermined condition or meets a predetermined threshold. Performance regression framework 437 may then automatically notify (block 835) a user of the detected regression for the particular build, commit, or line of code, for enabling targeted and efficient debugging (e.g., alert the developer who checked in source code whose corresponding build caused the deviation). For example, the data may be output as a widget (e.g., graph) showing a trendline as shown in FIG. 7, with an indication if any regression is detected. Alternately, a user may make a determination regarding whether or not performance for a monitored resource has deteriorated sufficiently (e.g., value of measurement data deviates by a predetermined amount) to thereby warrant debugging for the corresponding lines of code.

Figure 9:
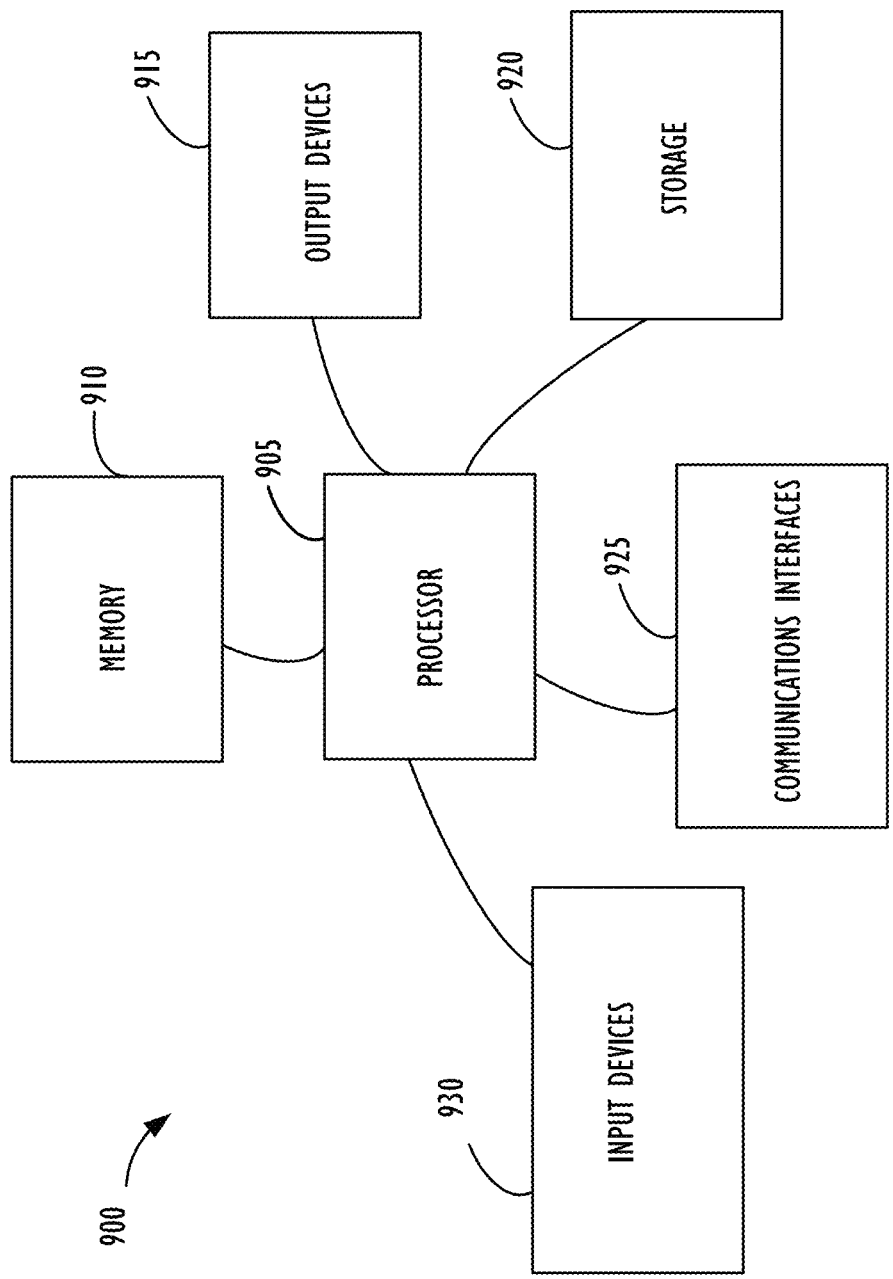
FIG. 9 illustrates a high-level block diagram 900 of a processing device (computing system) that may be used to implement one or more disclosed embodiments.

FIG. 9 illustrates a high-level block diagram 900 of a processing device (computing system) that may be used to implement one or more disclosed embodiments (e.g., data server computers 110, client computers 115, cloud resources platform/network 210, client devices 204A-204E, client instance 308, server instances 214, data centers 306A-306B, remote client device 455, production instance 445, test instance 430, CI server 420, performance regression framework 437, version control system 410, etc.). For example, computing device 900 illustrated in FIG. 9 could represent a client device or a physical server device and include either hardware or virtual processor(s) depending on the level of abstraction of the computing device. In some examples (without abstraction) computing device 900 and its elements as shown in FIG. 9 each relate to physical hardware and in some examples one, more, or all of the elements could be implemented using emulators or virtual machines as levels of abstraction. In any case, no matter how many levels of abstraction away from the physical hardware, computing device 900 at its lowest level may be implemented on physical hardware. As also shown in FIG. 9, computing device 900 may include one or more input devices 930, such as a keyboard, mouse, touchpad, or sensor readout (e.g., biometric scanner) and one or more output devices 915, such as displays, speakers for audio, or printers. Some devices may be configured as input/output devices also (e.g., a network interface or touchscreen display). Computing device 900 may also include communications interfaces 925, such as a network communication unit that could include a wired communication component and/or a wireless communications component, which may be communicatively coupled to processor 905. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 9, processing device 900 includes a processing element such as processor 905 that contains one or more hardware processors, where each hardware processor may have a single or multiple processor cores. In one embodiment, the processor 905 may include at least one shared cache that stores data (e.g., computing instructions) that are utilized by one or more other components of processor 905. For example, the shared cache may be a locally cached data stored in a memory for faster access by components of the processing elements that make up processor 905. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) or a microprocessor. Although not illustrated in FIG. 9, the processing elements that make up processor 905 may also include one or more other types of hardware processing components, such as graphics processing units (GPUs), application specific integrated circuits (ASICs), field-programmable gate arrays (FPGAs), and/or digital signal processors (DSPs).

FIG. 9 illustrates that memory 910 may be operatively and communicatively coupled to processor 905. Memory 910 may be a non-transitory medium configured to store various types of data. For example, memory 910 may include one or more volatile devices such as random access memory (RAM). Non-volatile storage devices 920 can include one or more disk drives, optical drives, solid-state drives (SSDs), tap drives, flash memory, read only memory (ROM), and/or any other type memory designed to maintain data for a duration time after a power loss or shut down operation. In certain embodiments, the non-volatile storage devices 920 may be used to store overflow data if allocated RAM is not large enough to hold all working data. The non-volatile storage devices 920 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 905. In one embodiment, the compiling process of the software program may transform program code written in a programming language to another computer language such that the processor 905 is able to execute the programming code. For example, the compiling process of the software program may generate an executable program that provides encoded instructions (e.g., machine code instructions) for processor 905 to accomplish specific, non-generic, particular computing functions.

After the compiling process, the encoded instructions may then be loaded as computer executable instructions or process steps to processor 905 from storage 920, from memory 910, and/or embedded within processor 905 (e.g., via a cache or on-board ROM). Processor 905 may be configured to execute the stored instructions or process steps in order to perform instructions or process steps to transform the computing device into a non-generic, particular, specially programmed machine or apparatus. Stored data, e.g., data stored by a storage device 920, may be accessed by processor 905 during the execution of computer executable instructions or process steps to instruct one or more components within the computing device 900.

A user interface (e.g., output devices 915 and input devices 930) can include a display, positional input device (such as a mouse, touchpad, touchscreen, or the like), keyboard, or other forms of user input and output devices. The user interface components may be communicatively coupled to processor 905. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the computing device 900 may comprise other components well known in the art, such as sensors, powers sources, and/or analog-to-digital converters, not explicitly shown in FIG. 9.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A computer system comprising:
   a memory; and
   one or more hardware processors communicatively coupled to the memory, wherein the memory comprises computer instructions that, when executed by the one or more hardware processors, cause the computer system to:
   access a source code repository to obtain a version of a portion of source code, wherein the portion of source code is updated within the source code repository by a plurality of commits;
   compile a build of a test instance for running the version of the portion of source code obtained from the source code repository;
   create a file for a performance regression test that monitors a resource based on a metric measured for the build of the test instance, wherein the metric corresponds to one of a plurality of preexisting metrics associated with an operation log for the build, wherein the file identifies the resource for performance monitoring, and identifies, from among the plurality of preexisting metrics, the metric for monitoring the resource;
   transmit the file to a continuous integration (CI) server to run the performance regression test on the build of the test instance;
   run the performance regression test;
   log, in the operation log for the build, measurement data of the plurality of preexisting metrics triggered by each of a plurality of operations, including measurement data of the metric triggered by a first operation, wherein the measurement data is logged in response to an incoming request for processing associated with the performance regression test for monitoring the resource;
   collect, from the operation log and for the build, the measurement data of the metric generated by the operation associated with the performance regression test for monitoring the resource;
   detect performance regression of the resource responsive to a determination that collected measurement data for the resource for the build meets a threshold value for the measurement data of the metric; and
   present the collected measurement data and an indication of detected performance regression of the metric for the build.

2. The computer system according to claim 1, wherein the plurality of preexisting metrics include a processing time, central processing unit percentage, a response time, a network time, structured query language (SQL) time, SQL count, enterprise rule time, enterprise rule count, client response time, client network time, total page load time, number of requests, browser time, client script time, and user interface policy time.

3. The computer system according to claim 1, comprising the CI server, and
   wherein the computer instructions that, when executed by the one or more hardware processors, cause the computer system to run the performance regression test on the build of the test instance comprise computer instructions that, when executed by the one or more hardware processors, cause the computer system to:
   bundle the version of the portion of the source code into an artifact on the CI server, wherein the artifact is a production-ready build of the test instance;
   run the performance regression test on the artifact; and
   tear down the artifact after publishing the measurement data.

4. The computer system according to claim 3, wherein the source code repository is accessed, and the version of the portion of the source code bundled into the artifact, on a periodic basis such that a plurality of builds of the test instance including the build of the test instance and corresponding artifacts including the artifact are compiled and bundled respectively.

5. The computer system according to claim 4, wherein the memory comprises computer instructions that, when executed by the one or more hardware processors, cause the computer system to:
   detect, for one of the plurality of builds of the test instance, performance regression of the resource responsive to a determination that the collected measurement data for the resource for the one of the plurality of builds meets a threshold difference value of the metric.

6. The computer system according to claim 1, wherein the memory comprises computer instructions that, when executed by the one or more hardware processors, cause the computer system to, in response to detecting performance regression of the resource for the build of the test instance:
   run the performance regression test on each of a plurality of bundled artifacts corresponding to the build of the test instance, the plurality of bundled artifacts respectively corresponding to the plurality of commits associated with the build of the test instance; and
   detect, for one of the plurality of bundled artifacts, the performance regression of the resource responsive to a determination that collected measurement data for the resource for the one of the plurality of bundled artifacts meets a threshold value for the measurement data of the metric.

7. The computer system according to claim 1, wherein the resource is accessible through a hypertext transfer protocol request to the test instance, and includes at least one of a given application programming interface, and a given uniform resource locator associated with the test instance.

8. The computer system according to claim 4, comprising a display device, and wherein the computer instructions that, when executed by the one or more hardware processors, cause the computer system to present the collected measurement data of the metric comprise computer instructions that, when executed by the one or more hardware processors, cause the computer system to:
   display, on the display device, a trendline indicating a value of the metric of the resource for the plurality of builds of the test instance including the build of the test instance over time.

9. A method comprising:
   accessing, for each of a plurality of builds of a test instance, a source code repository implemented on a version control system to obtain an updated version of a source code, wherein the source code repository is continuously updated by making a plurality of commits to the source code as part of an ongoing development process associated with the test instance;
   creating, for each of the plurality of builds a file for a performance regression test that monitors a resource based on a metric measured for the build of the test instance, wherein the metric corresponds to one of a plurality of preexisting metrics associated with an operation log for the build, wherein the file identifies the resource for performance monitoring, and identifies, from among the plurality of preexisting metrics, the metric for monitoring the resource;

transmitting, for each of the plurality of builds, the file to a continuous integration (CI) server to run the performance regression test on the build of the test instance;

running, on each of the plurality of builds, the performance regression test;

logging, for each of the plurality of builds, measurement data of the plurality of preexisting metrics triggered by each of a plurality of operations, including measurement data of the metric triggered by a first operation in an operation log for each of the plurality of builds, wherein the operation is logged in response to an incoming request for processing associated with the performance regression test for monitoring the resource;

collecting, based on the operation log and for each of the plurality of builds, the measurement data of the metric triggered by the operation associated with the performance regression test for monitoring the resource;

detecting, performance regression of the resource responsive to a determination that collected measurement data for the resource for one of the plurality of builds meets a threshold value for the measurement data of the metric; and presenting the collected measurement data of the metric for each of the plurality of builds and an indication of detected performance regression of the one of the plurality of builds.

10. The method according to claim 9, wherein the plurality of preexisting metrics include a processing time, central processing unit percentage, a response time, a network time, structured query language (SQL) time, SQL count, enterprise rule time, enterprise rule count, client response time, client network time, total page load time, number of requests, browser time, client script time, and user interface policy time.

11. The method according to claim 9, wherein running the performance regression test on each of the plurality of builds of the test instance comprises, for each of the plurality of builds:

bundling the updated version of the source code into an artifact on the CI server, wherein the artifact is a production-ready build of the test instance;

running the performance regression test on the artifact; and tearing down the artifact after publishing the measurement data.

12. The method according to claim 11, wherein for each of the plurality of builds of the test instance, the performance regression test is run on a same set of hardware on the CI server.

13. The method according to claim 11, wherein the source code repository is accessed, and the updated version of the source code bundled into the artifact on a periodic basis.

14. The method according to claim 9, comprising:

detecting, for one of the plurality of builds of the test instance, performance regression of the resource responsive to a determination that the collected measurement data for the resource for the one of the plurality of builds meets a threshold difference value for the measurement data of the metric.

15. A non-transitory computer-readable recording medium having stored thereon a program, the program comprising instructions that, when executed by one or more hardware processors, cause the one or more hardware processors to:

access a source code repository to obtain a version of a portion of source code, wherein the portion of source code is updated within the source code repository by a plurality of commits;

compile a build of a test instance for running the version of the portion of source code obtained from the source code repository;

create a file for a performance regression test that monitors a resource based on a metric measured for the build of the test instance, wherein the metric corresponds to one of a plurality of preexisting metrics associated with an operation log for the build, wherein the file identifies the resource for performance monitoring, and identifies, from among the plurality of preexisting metrics, the metric for monitoring the resource;

transmit the file to a continuous integration (CI) server to run the performance regression test on the build of the test instance;

run the performance regression test;

log measurement data of the plurality of preexisting metrics triggered by each of a plurality of operations, including measurement data of the metric triggered by a first operation in an operation log for each of a plurality of builds, wherein the operation is logged in response to an incoming request for processing associated with the performance regression test for monitoring the resource;

collect, from the operation log and for each of the plurality of builds, the measurement data of the metric triggered by the operation associated with the performance regression test for monitoring the resource;

detect performance regression of the resource responsive to a determination that the collected measurement data for the resource for one of the plurality of builds meets a threshold value for the measurement data of the metric;

present collected measurement data of the metric for each of the plurality of builds; and present the collected measurement data an indication of the detected performance regression of the metric for the one of the plurality of builds.

16. The computer system of claim 6, comprising:

transmitting, to one or more display devices associated with one or more respective developers who performed the plurality of commits associated with the one of the plurality of bundled artifacts, an alert comprising the collected measurement data for the resource for the one of the plurality of bundled artifacts and an indication of detected performance regression of the one of the plurality of bundled artifacts.

17. The computer system of claim 8, comprising:

indicating, via the display device, a performance regression corresponding to the value of the metric associated with one of the plurality builds of the test instance.

* * * * *